(12) United States Patent
Chun et al.

(10) Patent No.: US 9,008,004 B2
(45) Date of Patent: Apr. 14, 2015

(54) METHOD FOR SENDING RLC PDU AND ALLOCATING RADIO RESOURCE IN MOBILE COMMUNICATIONS SYSTEM AND RLC ENTITY OF MOBILE COMMUNICATIONS

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1449 days.

(21) Appl. No.: 12/363,387

(22) Filed: Jan. 30, 2009

(65) Prior Publication Data

US 2009/0215456 A1    Aug. 27, 2009

Related U.S. Application Data

(60) Provisional application No. 61/025,311, filed on Feb. 1, 2008, provisional application No. 61/026,119, filed on Feb. 4, 2008.

(30) Foreign Application Priority Data

Jan. 29, 2009   (KR) .................. 10-2009-0007152

(51) Int. Cl.
*H04W 4/00* (2009.01)
*H04W 72/10* (2009.01)
(Continued)

(52) U.S. Cl.
CPC .......... *H04W 72/10* (2013.01); *H04W 72/1257* (2013.01); *H04W 72/00* (2013.01); *H04W 72/1242* (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS 6,388,997 B1   5/2002   Scott
6,505,253 B1   1/2003   Chiu et al.
(Continued)

FOREIGN PATENT DOCUMENTS

CN   1620768 A   5/2005
CN   1951043 A   4/2007
(Continued)

OTHER PUBLICATIONS

Somasundaram et al., U.S. Appl. No. 61/019,049, "RRC Procedures for RLC Reset," ITC-2-1945.00.US, pp. 1-19.
(Continued)

*Primary Examiner* — Jung-Jen Liu
(74) *Attorney, Agent, or Firm* — Birch, Stewart, Kolasch & Birch, LLP

(57) ABSTRACT

Disclosed is a transmission of a RLC STATUS PDU using a limited radio resource by MAC and RLC layers in a long term evolution (LTE) system. In case where the MAC entity prioritizes logical channels for allocating the radio resource to each logical channel, the MAC entity is allowed to allocate radio resources based upon the size of a RLC STATUS PDU to be sent from the RLC layer and also the RLC layer is allowed to use the STATUS PDU prior to RLC data PDUs upon using the allocated radio resource, such that RLC protocols can be avoided from coming in a deadlock situation due to a non-transmission of the STATUS PDU.

10 Claims, 7 Drawing Sheets

(51) Int. Cl.
*H04W 72/12* (2009.01)
*H04W 72/00* (2009.01)

(56) References Cited

U.S. PATENT DOCUMENTS

| | | |
|---|---|---|
| 6,826,193 B1 | 11/2004 | Peisa |
| 7,403,541 B2 | 7/2008 | Yi et al. |
| 7,631,239 B2 | 12/2009 | Yeo et al. |
| 7,804,850 B2 | 9/2010 | Sebire et al. |
| 2003/0100268 A1 | 5/2003 | Moulsley et al. |
| 2003/0123485 A1 | 7/2003 | Yi et al. |
| 2003/0128705 A1 | 7/2003 | Yi et al. |
| 2003/0131124 A1 | 7/2003 | Yi et al. |
| 2003/0147348 A1 | 8/2003 | Jiang |
| 2003/0152106 A1* | 8/2003 | Burmeister et al. .......... 370/468 |
| 2004/0008659 A1 | 1/2004 | Kim |
| 2004/0032851 A1* | 2/2004 | Wu .............................. 370/346 |
| 2004/0037224 A1 | 2/2004 | Choi et al. |
| 2004/0153852 A1 | 8/2004 | Wu |
| 2004/0213199 A1 | 10/2004 | Cheng |
| 2004/0223507 A1 | 11/2004 | Kuchibhotla et al. |
| 2005/0074024 A1 | 4/2005 | Kim et al. |
| 2005/0220040 A1 | 10/2005 | Petrovic et al. |
| 2006/0056355 A1 | 3/2006 | Love et al. |
| 2006/0062223 A1* | 3/2006 | Manuel et al. ................ 370/394 |
| 2006/0067238 A1 | 3/2006 | Olsson et al. |
| 2006/0156165 A1 | 7/2006 | Kim |
| 2006/0176862 A1 | 8/2006 | Ishimori et al. |
| 2006/0251027 A1 | 11/2006 | Chun et al. |
| 2006/0251105 A1 | 11/2006 | Kim et al. |
| 2006/0282739 A1 | 12/2006 | Meyer et al. |
| 2007/0064599 A1* | 3/2007 | Jiang ............................ 370/229 |
| 2007/0079207 A1 | 4/2007 | Seidel et al. |
| 2007/0081513 A1* | 4/2007 | Torsner ........................ 370/349 |
| 2007/0097937 A1 | 5/2007 | Kubota et al. |
| 2007/0116024 A1* | 5/2007 | Zhang et al. ................. 370/412 |
| 2007/0133605 A1* | 6/2007 | Herrmann .................... 370/473 |
| 2007/0168827 A1* | 7/2007 | Lohr et al. ................... 714/749 |
| 2007/0293157 A1 | 12/2007 | Haartsen et al. |
| 2007/0300120 A1 | 12/2007 | Kim et al. |
| 2008/0002660 A1 | 1/2008 | Jeong et al. |
| 2008/0010578 A1 | 1/2008 | Jiang |
| 2008/0080472 A1 | 4/2008 | Bertrand et al. |
| 2008/0117891 A1 | 5/2008 | Damnjanovic et al. |
| 2008/0186946 A1* | 8/2008 | Marinier et al. ............. 370/349 |
| 2008/0215948 A1 | 9/2008 | Pinheiro et al. |
| 2008/0219291 A1* | 9/2008 | Obuchi et al. ............... 370/469 |
| 2008/0225817 A1 | 9/2008 | Moon et al. |
| 2008/0253375 A1 | 10/2008 | Yi et al. |
| 2008/0298322 A1 | 12/2008 | Chun et al. |
| 2008/0310396 A1 | 12/2008 | Park et al. |
| 2009/0034476 A1 | 2/2009 | Wang et al. |
| 2009/0034478 A1 | 2/2009 | Hobza |
| 2009/0086657 A1 | 4/2009 | Alpert et al. |
| 2009/0103511 A1* | 4/2009 | Marinier et al. ............. 370/345 |
| 2009/0104890 A1 | 4/2009 | Wang et al. |
| 2009/0119564 A1* | 5/2009 | Sagfors et al. ............... 714/748 |
| 2009/0175175 A1 | 7/2009 | Somasundaram et al. |
| 2009/0175206 A1* | 7/2009 | Wang et al. .................. 370/310 |
| 2009/0232107 A1 | 9/2009 | Park et al. |
| 2010/0157916 A1 | 6/2010 | Kim et al. |
| 2010/0260049 A1* | 10/2010 | Racz et al. ................... 370/235 |
| 2010/0278051 A1* | 11/2010 | Larmo et al. ................ 370/242 |
| 2010/0279695 A1 | 11/2010 | Amirijoo et al. |
| 2011/0158197 A1* | 6/2011 | Reznik et al. ............... 370/329 |
| 2013/0242871 A1* | 9/2013 | Marinier et al. ............ 370/328 |
| 2013/0279490 A1* | 10/2013 | Pani et al. .................... 370/346 |

FOREIGN PATENT DOCUMENTS

| | | |
|---|---|---|
| EP | 1353481 A2 | 10/2003 |
| EP | 1361706 A2 | 11/2003 |
| EP | 1788751 A1 | 5/2007 |
| EP | 1871137 A2 | 12/2007 |
| GB | 2429605 A | 2/2007 |
| JP | 2001-320417 A | 11/2001 |
| JP | 2004-274170 A | 9/2004 |
| JP | 2006-203265 A | 8/2006 |
| JP | 2006-245887 A | 9/2006 |
| JP | 2007-208635 A | 8/2007 |
| JP | 2007-288746 A | 11/2007 |
| JP | 2009-521891 A | 6/2009 |
| KR | 2002-0060800 A | 7/2002 |
| KR | 2003-0060026 A | 7/2003 |
| KR | 10-2006-0055175 A | 5/2006 |
| KR | 10-2007-0096392 A | 10/2007 |
| KR | 10-2007-0108801 A | 11/2007 |
| KR | 10-2007-0109313 A | 11/2007 |
| KR | 10-2007-0121585 A | 12/2007 |
| WO | WO 2005/034418 A1 | 4/2005 |
| WO | WO-2005/112327 A2 | 11/2005 |
| WO | WO 2007/052098 A2 | 5/2007 |
| WO | WO 2009/088903 A2 | 7/2009 |

OTHER PUBLICATIONS

Wang, U.S. Appl. No. 60/976,139, "Operation of Control Protocol Data Units in Packet Data Convergence Protocol," ITC-2-1845.00. US, pp. 1-12.

"PDCP actions at RLC re-establishment", NTT DoCoMo, Inc., 3GPP TSG RAN WG2 #63, Aug. 18, 2008, retrieved from the Internet: http://www.3gpp.org/ftp/tsg_ran/WG2_RL2/TSGR2_63/Docs/, XP-002523462.

Interdigital: "RLC Window Management and Receive Buffer Overflow" 3GPP DRAFT; R2-080063, 3rd Generation Partnership-Project (3GPP), Mobile Competence Centre; 650, Route Des Lucioles; F-06921 Sophia-Antipolis Cedex; France, vol. RAN WG2, no. Sevilla, Spain; Jan. 9, 2008, XP050137961 [retrieved on Jan. 9, 2008] *p. 4, paragraph 2*.

LG Electronics Inc: "RLC re-segmentation for improved L2 uplink" 3GPP Draft; R2-075099 RLC Resegmentation for Improved L2 Uplink, 3rd Generation Partnership Project (3GPP), Mobile Competence Centre; 650, Route Des Lucioles; F-06921 Sophia-Antipolis Cedex; France, vol. RAN WG2, no. Jeju; Nov. 12, 2007 *sections 2.1 and 2.2A. ; p. 1*.

Qualcomm: "RLC Prioritization Scheme" 3GPP Draft; R2-051967 RLC Prioritization Scheme, 3rd Generation Partnership Project (3GPP), Mobile Competence Centre; 650, Route Des Lucioles; F-06921 Sophia-Antipolis Cedex; France, vol. RAN WG2, no. London, UK; Aug. 24, 2005, XP050129109 [retrieved on Aug. 24, 2005] *p. 1, last paragraph*.

3GPP TSG-RAN WG2 #63, R2-084392, Jeju, South Korea, Aug. 18-22, 2008, 6.1.1.5, LG Electronics Inc., "Handling of Nacked Date in HARQ Buffer When UL State is Out of Sync," Discussion and Decision, pp. 1-2.

3GPP TSG-RAN WG2 #60bis, R2-080153, Sevilla, Spain, Jan. 14-18, 2008, LG Electronics Inc., UE Specific Sync Timer signaling and procedure, Discussion and Decision, pp. 1-3.

"3GPP TS.36.321, V8.0.0, 3rd Generation Partnership Project; Technical Specification Group Radio Access Network; Evolved Universal Terrestrial Radio Access (E-UTRA) Medium Access Control (MAC) protocol specification," (Release 8) Dec. 1, 2007, pp. 1-23.

3GPP TSG RAN WG2 #60bis, R2-080454 Jan. 14-18, 2008, Sevilla, Spain, NTT DoCoMo, Inc., "UL SRS resource release at TA Timer expiry," Discussion and Decision.

Interdigital, "RLC Window Management and Receive Buffer Overflow," 3GPP TSG RAN WG2 #60bis, R2-080063, Sevilla, Spain, Jan. 14-18, 2008, 6 pages.

LG Electronics Inc., "RLC Re-segmentation for Improved L2 Uplink," 3GPP TSG-RAN WG2 #60, R2-075099, Jeju, Korea, Nov. 5-9, 2007, 2 pages.

* cited by examiner

METHOD FOR SENDING RLC PDU AND ALLOCATING RADIO RESOURCE IN MOBILE COMMUNICATIONS SYSTEM AND RLC ENTITY OF MOBILE COMMUNICATIONS

The present application claims the priority benefits of U.S. Provisional Applications Nos. 61/025,311 and 61/026,119 respectively filed on Feb. 1, 2008 and Feb. 4, 2008 and Korean Patent Application No. 10-2009-0007152 filed on Jan. 29, 2009 in Republic of Korea. The entire contents of these applications are herein fully incorporated by reference.

TECHNICAL FIELD

The present invention relates to a radio protocol in a mobile communications system, and more particularly, a method in which MAC and RLC layers in a long term evolution (LTE) system sends RLC STATUS PDUs using a limited radio resource.

BACKGROUND ART

FIG. 1 is a network architecture of a long term evolution (LTE) system which is the related art mobile communication system has evolved from the existent UMTS system and a basic standardization therefor is undergoing in 3GPP.

The LTE network may be divided into evolved UMTS terrestrial radio access network (E-UTRAN) and core network (CN). The E-UTRAN includes a terminal (User Equipment; UE), a base station (Evolved Node B; eNB), an access gateway (aGW) located at the end of the network to be connected to an external network. The aGW may be divided into a portion of handling a user traffic and a portion of processing a control traffic. Here, a new interface may be used for the communication between the aGW for processing the user traffic and the aGW for processing the control traffic. One or more cells may exist in one eNB. An interface for transmission of the user traffic or control traffic may be used between eNBs. The CN may include an aGW, a node for a user registration of other UEs and the like. An interface may be used to identify the E-UTRAN and CN.

FIG. 2 is an architecture of a radio interface protocol control plane between a terminal and an E-UTRAN based upon the 3GPP radio access network standard, and FIG. 3 is an architecture of a radio interface protocol user plane between a terminal and an E-UTRAN based upon the 3GPP radio access network standard.

Hereinafter, the architecture of radio interface protocols between the terminal and the E-UTRAN will be described with reference to FIGS. 2 and 3.

The radio interface protocol has horizontal layers comprising a physical layer, a data link layer and a network layer, and has vertical planes comprising a user plane for transmitting data information and a control plane for transmitting a control signaling. The protocol layers can be divided into a first layer (L1), a second layer (L2) and a third layer (L3) based on three lower layers of an Open System Interconnection (OSI) standard model widely known in communications systems. Such radio interface protocols may exist as a pair between the terminal and the E-UTRAN, to manage data transmissions over interfaces.

Hereinafter, each layer in the radio protocol control plane in FIG. 2 and the radio protocol user plane in FIG. 3 will be described.

A first layer, as a physical (PHY) layer, provides an information transfer service to an upper layer using a physical channel. The physical layer is connected to its upper layer, called a Medium Access Control (MAC) layer, via a transport channel. The MAC layer and the physical layer exchange data via the transport channel. Here, the transport channels may be divided into a dedicated transport channel and a common transport channel depending on whether the transport channel is shared. Data is transferred via a physical channel between different physical layers, namely, between the physical layer of a transmitting side and the physical layer of a receiving side.

Various layers exist in the second layer. First, a medium access control (MAC) layer serves to map different logical channels to different transport channels, and also performs a logical channel multiplexing for mapping several logical channels to one transport channel. The MAC layer is connected to an upper radio link control (RLC) layer via a logical channel. Logical channels are is divided according to a type of information to be transmitted into a control channel for transmitting control plane information and a traffic channel for transmitting user plane information.

The RLC layer of the second layer manages segmentation and concatenation of data received from an upper layer to appropriately adjust a data size such that a lower layer can send data over an interface. Also, the RLC layer provides three operation modes, including a transparent mode (TM), an un-acknowledged mode (UM) and an acknowledged mode (AM), so as to guarantee various quality of service (QoS) requirements of each radio bearer (RB). In particular, the RLC layer operating in the AM mode (hereinafter, referred to as AM RLC layer) performs a retransmission using an automatic repeat and request (ARQ) function for a reliable data transmission.

A packet data convergence protocol (PDCP) layer located at the second layer is used to efficiently transmit IP packets, such as IPv4 or IPv6, on a radio interface with a relatively small bandwidth. For this purpose, the PDCP layer reduces the size of an IP packet header which is relatively great in size and includes unnecessary control information, namely, performs a function called header compression. Accordingly, only necessary information can be included in the header part of data for transmission, so as to increase a transmission efficiency of a radio interface.

A radio resource control (RRC) layer located at the lowermost portion of the third layer is only defined in the control plane. The RRC layer controls logical channels, transport channels and physical channels in relation to configuration, re-configuration and release of Radio Bearers (RBs). Here, the RB denotes a logical path that the L2 layer provides for data transmission between the terminal and the UTRAN. In general, the establishment of the RB refers to stipulating the characteristics of protocol layer and channel required for providing a specific service, and setting the respective detailed parameters and operation methods. The RBs are divided into a signaling RB (SRB) and a data RB (DRB). The SRB is used as a path for transmission of RRC messages in the C-plane, while the DRB is used as a path for transmissions of user data in the U-plane.

Hereinafter, the RLC layer will be described in more detail. The RLC layer provides three modes, such as the TM, UM and AM, as mentioned above. The RLC layer rarely performs a function in the TM, and thus UM and AM will only be described herein. The UM RLC adds a protocol data unit (PDU) header including a sequence number (SN) to each PDU for transmission, such that a receiving side can be known as to which PDU has been lost during transmission. Due to such function, the UM RLC manages, in the user plane, the transmission of multimedia data or the transmission of real-time packet data, such as voice (e.g., VoIP) or streaming in a packet service domain (hereinafter, referred to as a PS domain), while managing, in the control plane, the transmission of an RRC message, which does not need a reception acknowledgement, among RRC messages sent to a specific terminal or specific terminal group within a cell.

Similarly, the AM RLC constructs a PDU by adding a PDU header including an SN upon the construction of PDU. Unlike the UM RLC, a receiving side acknowledges a PDU sent by a transmitting side. The receiving side acknowledges in order to request a retransmission of unsuccessfully received PDU from the transmitting side. Such retransmission function is the most important characteristic of the AM RLC. Thus, the AM RLC aims to guarantee an error-free data transmission via the retransmission. Under the purpose, the AM RLC usually manages a non-real-time packet data transmission, such as TCP/IP of PS domain, in the user plane, while managing a transmission of RRC message, which requires a reception acknowledgement, among RRC messages transmitted to a specific terminal within a cell in the control plane.

From the perspective of direction, the UM RLC is used for a unidirectional communication, while the AM RLC is used for a bi-directional communication due to a feedback from a receiving side. From the structural perspective, there is a difference, namely, the UM RLC is configured such that one RLC entity performs transmission or reception while the AM RLC is configured such that both transmitting side and receiving side exist in one RLC entity. The complicated configuration of the AM RLC is due to the retransmission. The AM RLC includes a retransmission buffer for managing the retransmission, in addition to a transmission/reception buffer. Also, the AM RLC performs various functions, such as using transmitting and receiving windows for a flow control, polling for a transmitting side to request status information from a receiving side of an RLC entity, sending a status report for a receiving side to report its buffer state to a transmitting side of a peer RLC entity, constructing a status PDU for delivering status information, and the like. The AM RLC also needs various protocol parameters, such as status variables and a timer, in order to support the functions. A PDU, such as status report or status PDU, which is used for controlling the data transmission in the AM RLC, is referred to as 'Control PDU', and a PDU used for transferring user data is referred to as 'Data PDU'.

An RLC data PDU in the AM RLC may be divided into AMD PDU and AMD PDU segment, in detail. The AMD PDU segment has part of data included in the AMD PDU. In the LTE system, a maximum size of a data block is changeable every time a terminal sends the data block. Hence, after a transmitting side AM RLC entity constructs a 200-byte AMD PDU at a specific time and transmits the constructed AMD PDU, when the transmitting side AM RLC receives NACK from a receiving side AM RLC and thereby tries to retransmit the AMD PDU, if a maximum size of data block to be actually transmittable is 100 bytes, the same AMD PDU cannot be sent as it is. In this case, the AMD PDU segment is used. The AMD PDU segment denotes that the corresponding AMD PDU is segmented into smaller units. During the procedure, the transmitting side AM RLC entity divides the AMD PDU into the AMD PDU segments and transmits the AMD PDU segments over several transmission time intervals. The receiving side AM RLC entity then restores the AMD PDU from the received AMD PDU segments.

If there is unsuccessfully (incompletely or incorrectly) received data, the receiving side AM RLC requests a retransmission of such data from the transmitting side AM RLC, which is referred to as 'status report'. The status report is sent by using STATUS PDU, which is one of control PDUs.

FIG. 4 is a format of STATUS PDU currently used in the LTE system. In FIG. 4, a horizontal axis denotes a length of an RLC STATUS PDU with 8 bits, namely, 1 octet.

Each field of the RLC STATUS PDU will now be described.

1. Data/Control (D/C) field: 1 bit
   This field indicates whether a corresponding RLC PDU is either RLC data PDU or RLC control PDU.
2. Control PDU type (CPT) field: 3 bits
   This field indicates what type a corresponding control PDU is. The RLC control PDU currently defines only the STATUS PDU.
3. Acknowledgement Sequence Number (ACK_SN)
   Two types of ACK_SN will be defined as follows.
   1-1) A type of ACK_SN is an RLC SN of a first PDU whose information is not included in a STATUS PDU.
   1-2) Upon receiving the STATUS PDU, a transmitting side determines that all the PDUs among PDUs up to the PDU with ACK_SN-1 have successfully been received by a receiving side, excluding PDUs indicated in the STATUS PDU with NAC_SN or portions of PDUs indicated in the STATUS PDU with NACK_SN, SOstart and SOend.

Such ACK_SN was applied to embodiments of FIGS. 6 and 8 according to the present invention.

2-1) Another type of ACK_SN is an RLC SN of a first PDU whose information is included in a STATUS PDU.
   2-2) Upon receiving the STATUS PDU, the transmitting side determines that all the PDUs among PDUs up to the PDU with the ACK_SN have successfully been by the receiving side, excluding PDUs indicated in the STATUS PDU with NACK_SN or portions of PDUs indicated in the STATUS PDU with NACK_SN, SOstart and SOend.

Such ACK_SN was applied to embodiments of FIGS. 7 and 9 according to the present invention.

4. Extension 1 (E1): 1 bit
   This indicates whether there is another NACK_SN element following a current NACK_SN element (i.e., indicated with NACK_SN or with NACK_SN, SOstart and SOend).
5. NACK_SN (Negative acknowledgement Sequence Number)
   This is an RLC SN of an unsuccessfully received AMD PDU or AMD PDU segment.
5. Extension 2 (E2): 1 bit
   This indicates whether there are SOstart and SOend fields corresponding to a current NACK_SN.
6. Segment Offset Start (SOstart) and Segment Offset End (SOend)
   These are used when only a part (segment) of PDU with NACK_SN is NACK. A first byte of the part corresponds to the SOstart and the last byte thereof corresponds to the SOend.

In the meantime, the receiving side AM RLC cannot always trigger a STATUS PDU, but can trigger a status reporting only when a specific condition is met. Such condition is referred to as 'status reporting trigger', and the LTE system currently uses two conditions as follows.

The first condition is a polling of a transmitting side.

That is, when desiring to receive a status report from a receiving side, the transmitting side AM RLC sets a poll bit for an RLC data PDU for transmission.

The receiving side AM RLC then triggers the status report upon receiving the poll bit set RLC data PDU.

The second condition is a detection of an unsuccessful reception of RLC data PDU.

That is, upon detecting an unsuccessfully received RLC data PDU (i.e., AMD PDU or AMD PDU segment) after completing a HARQ reordering, the receiving side AM RLC triggers the status report.

In addition, when the status report is triggered, the receiving side AM RLC sends a reception buffer state to the transmitting side using a STATUS PDU. Here, is the STATUS PDU includes information up to the last PDU (=VR(MS)) among PDUs within the range of a PDU (=VR(R)) with a start point of a receiving window to a HARQ reordering completed PDU. Here, the VR(R) and VR(MS) denote state variables, which are managed by the receiving side AM RLC and used for a receiving window, a status report and the like. Among others, the receiving AM RLC manages additional state variables.

Such additional state variables of the receiving side AM RLC are described as follows.

VR(R): Receive state variable.
- It hold a value of a sequence number (SN) of an AMD PDU subsequent to the last AMD PDU among AMD PDUs received in-sequence.
- It is a first AMD PDU among AMD PDUs which are not completely (successfully) received by the receiving side AM RLC.
- It serves as the lower edge of the receiving window.
- It is initially set to 0. When completely receiving an AMD PDU with SN=VR(R), it is updated to a value of SN of a first incompletely received AMD PDU subsequent to the AMD PDU.

VR(MR): Maximum acceptable receive state variable.
- It holds a value of SN of the first AMD PDU among AMD PDUs outside a receiving window.
- It serves as the higher edge of the receiving window.
- It is updated, for example, to VR(MR)=VR(R)+AM_Window_size when the VR(R) is updated.

VR(X): T_reordering state variable
- It holds a value of SN of an RLC data PDU subsequent to an RLC data PDU which triggered a T_reordering as a timer for managing a HARQ reordering.
- A receiving side AM RLC drives the T_reordering upon receiving an out-of-sequence RLC data PDU under a condition that no T_reordering is triggered, and sets the VR(X) to the value of SN of an RLC data PDU subsequent to the RLC data PDU.

VR(MS): Maximum status transmit state variable
- This state variable is used for including in a STATUS PDU information only related to RLC data PDUs for which the HARQ reordering is completed.
- It is initially set to 0, and upon completely receiving an AMD PDU with SN=VR(MS), it is updated to a value of SN of a first incompletely received AMD PDU following the AMD PDU.
- Upon the T_reordering expired, it is updated to a value of SN of a first incompletely received AMD PDU among AMD PDUs higher than VR(X). ACK_SN is set to the VR(MS) so as to construct a STATUS PDU.

VR(H): highest received state variable
- It holds a value of the very next SN of the highest SN among RLC data PDUs received by the receiving side AM RLC, namely, a value of SN of an RLC data PDU which is first unsuccessfully received by the receiving side AM RLC.
- It is initially set to 0, and upon receiving an RLC data PDU higher than VR(H), it is updated to a value of SN of an RLC data PDU subsequent to the RLC data PDU.

Hereinafter, a logical channel prioritization (LCP) performed by the MAC layer will be described.

When several radio bearers (RBs) are multiplexed and transmitted over one transport channel, an LTE terminal is configured such that its MAC layer decides an amount of transmission data for each RB, based upon the following rules, with respect to a given radio resource, for every transmission time interval (TTI).

1. The MAC layer decides an amount of transmission data for multiplexed RBs in a decreasing order of each logical channel priority (LCP), and then decides a transmission amount as much as data corresponding to a maximum prioritized bit rate (PBR) for each RB.
2. If any radio resources remain, the MAC layer decides the amount of transmission data for the multiplexed RBs in the decreasing order of each LCP.

Here, 1 to 8 LCPs are currently discussed, and 1 denotes the highest priority and 8 denotes the lowest priority. PBR denotes a minimum bit rate guaranteed for a corresponding RB, which means that the LTE system can support such degree of bit rate even under a very bad radio environment. The PBR may be set within the range of 0 to infinity.

In the meantime, LCP and PBR of each RB are sent from a network RRC to a terminal RRC via an RB setup message upon initially setting the RB. After receiving the RB setup message, the terminal RRC then sets necessary RBs and sends information on LCP and PBR of each RB to a terminal MAC. The MAC having received such information decides a transmission amount of each RB with respect to a given radio resource for every TTI, base upon such rules.

DISCLOSURE

Technical Solution

While performing a logical channel prioritization (LCP), the MAC considers only LCP and PBR. Therefore, it is possible that, for a certain logical channel, the allocated radio resource might be smaller than an RLC STATUS PDU to be sent via the corresponding logical channel. However, when a status report is triggered, a receiving side AM RLC is allowed to include all information related to AMD PDUs within a preset range into a STATUS PDU for transmission. Accordingly, if the radio resource to send the STATUS PDU is smaller than the STATUS PDU, the constructed STATUS PDU cannot be sent. The related art didn't consider such situation. As a result, such situation occurs, the constructed RLC STATUS PDU cannot be sent, thereby causing a deadlock situation.

Therefore, an object of the present invention is that, in case where a MAC layer performs a logical channel prioritization in order to allocate a radio resource to each logical channel, a MAC layer (MAC entity) is allowed to allocate a radio resource based upon the size of a RLC STATUS PDU to be sent from an RLC layer and the RLC layer is allowed to use a STATUS PDU prior to RLC data PDU upon using the allocated radio resource, whereby RLC protocols can be prevented from coming in a deadlock due to an unsuccessful transmission of the STATUS to PDU. To this end, the present invention proposes the operation of the MAC and the operation of the RLC, respectively.

To solve the problem of the related art, a method for transmitting radio link control (RLC) protocol data units (PDUs) in a mobile communications system, comprising: receiving an indication of available resource from a medium access control (MAC) entity; prioritizing transmission of RLC control PDUs over RLC data PDUs using the indication of available resource; and transmitting the prioritized RLC PDUs using the received available resource.

The method may further include allocating the available resource to the RLC control PDUs, and if any resource remains, then allocating the remaining resource to the RLC data PDUs.

The RLC control PDUs may denote RLC STATUS PDUs, and the method may further include if the available resource indicated from the MAC entity is smaller than the size of one status PDU, skipping by the RLC entity the transmission of one status PDU for this transmitting opportunity.

The available resource and the one status PDU may be checked for every transmission time interval (TTI).

The RLC control PDUs may denote RLC STATUS PDUs, and the method may further include checking by the RLC entity for every transmission time interval (TTI) whether a STATUS PDU is scheduled for transmission, and if so, then informing the size of the STATUS PDU to the MAC entity.

In one aspect of the present invention, a method for allocating resources for transmission in a mobile communications system, may include: allocating the resources such that all logical channels are served in a decreasing priority order up to the size of each radio link control (RLC) STATUS protocol data unit (PDU) waiting for transmission; if any resources remain, allocating such remaining resources such that all the logical channels are served in a decreasing priority order up to their configured prioritized bit rate (PBR); and if any resources remain, allocating such remaining resources such that all the logical channels are served in a strictly decreasing priority order.

The method may further include: checking by a medium access control (MAC) entity whether a STATUS PDU is scheduled for transmission for every transmission time interval (TTI) in the RLC entity; and receiving information related to the size of the STATUS PDU if there is the STATUS PDU scheduled for transmission.

In another aspect of the present invention, a method for allocating resources in a mobile communications system, may include: allocating, by a medium access control (MAC) layer, resources such that all logical channels are served in a decreasing priority order up to each prioritized bit rate (PBR) of the logical channels plus the size of each RLC STATUS PDU waiting for transmission; and if any resources remain, allocating, by the MAC entity, the remaining resource such that all the logical channels are served in a strict decreasing priority order.

The method may further include checking, by the MAC entity, whether a STATUS PDU is scheduled for transmission for every TTI in the RLC entity, and receiving information related to the size of the STATUS PDU if the STATUS PDU is scheduled for transmission.

In one aspect of the present invention, a radio link control (RLC) entity in a mobile communications system may include a module configured to: receive an indication of resource from a medium access control (MAC) entity; check whether there is a STATUS PDU is scheduled to be sent to a peer RLC entity; compare the size of the indicated resource with the size of the STATUS PDU to be sent; primarily allocate the resource to the STATUS PDU so as to send the STATUS PDU to the peer RLC entity if the resource is larger than or equal to the STATUS PDU according to the comparison result; and skip the transmission of the STATUS PDU if the resource is smaller than the STATUS PDU according to the comparison result.

Advantageous Effect

The related art has not defined an operation method of a receiving side AM RLC when a radio resource is smaller than a STATUS PDU scheduled for transmission, which causes a deadlock situation of protocols. Therefore, the present invention allows a MAC layer to consider the size of a RLC STATUS PDU upon allocating resources and also allows an RLC layer to primarily allocate resources to a RLC STATUS PDU upon allocating resources, so as to enable a stable operation of protocols regardless of radio circumstances.

MODE FOR INVENTION

The present invention is applied to a mobile communication system, and particularly, to an evolved universal mobile telecommunications system (E-UMTS) evolved from the UMTS. However, the present invention may not be limited to the system, but applicable to any communication system and communication protocol complying with the scope of the present invention.

As the present features may be embodied in several forms without departing from the characteristics thereof it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Terms containing ordinal numbers such as 1, 2 and the like, may be used to describe various components, but the components may not be limited to the terms. The terms are used for the purpose of distinguishing one component from another component. For example, a first component may be named as a second component without departing from the scope of the present invention, and similarly the second component may be named as the first component. A term 'and/or' will include a combination of plural associated items or any of plural associated items.

When mentioning that one component is 'connected' or 'accessed' to another component, the one component may be directly connected or accessed to the another component, however, any intermediate component(s) may exists therebetween. On the other hand, when mentioning that one component is 'directly connected' or 'directly accessed' to another component, it could be understood that other intermediate components do not exist therebetween.

Terms used in the present invention are used to illustrate the preferred embodiments, but not intended to limit the present invention. A singular representation may include a plural representation as far as it represents a definitely different meaning from the context. Terms 'include' or 'has' used in the present invention should be understood that they are intended to indicate an existence of feature, number, step, operation, component, item or any combination thereof, disclosed in the specification, but should not be understood that they are intended to previously exclude an existence of one or more other features, numbers, steps, operations, components, or any combination thereof or possibility of adding those things. As far as not being defined differently, all terms used herein including technical or scientific terms may have the same meaning as those generally understood by an ordinary person skilled in the art to which the present is invention belongs to. Commonly used terms having the same meanings defined in the dictionary should be construed as having the meanings equal to the contextual meanings. As far as not being definitely defined in the present invention, such terms should not be construed as having ideal or excessively formal meanings.

Hereinafter, description will be given in detail of the preferred embodiments according to the present invention with reference to the accompanying drawings. For the sake of brief description with reference to the drawings, the same or equivalent components regardless of reference numerals will be provided with the same reference numbers, and description thereof will not be repeated.

The present invention recognized the point that, for a certain logical channel, a STATUS PDU cannot be constructed if the allocated radio resource is smaller than a RLC STATUS PDU to be sent via the corresponding logical channel.

Considering such recognition, the present invention is conceptually characterized in that 1) in case where a MAC layer (MAC entity) performs a logical channel prioritization in order to allocate a radio resource to each logical channel, 2) the MAC layer is allowed to allocate the radio resource based upon the size of a RLC STATUS PDU to be sent from the RLC layer, and also 3) the RLC layer is allowed to use the STATUS PDU prior to RLC data PDU upon using the allocated radio resource, whereby 4) the RLC protocols can be prevented from coming in a deadlock situation due to a non-transmission of the STATUS PDU.

First and second embodiments of the present invention illustrate an operation method in a MAC layer, and a third embodiment of the present invention illustrates an operation method in an RLC layer. In the embodiments of the present invention, a radio resource may briefly be referred to as 'resource', and also is referred to as 'transmitting resource' because it is used for the transmission of a STATUS PDU.

Also, in the first to third embodiments of the present invention, the STATUS PDU is sent from an RLC entity to a peer RLC entity. Thus, the STATUS PDU may denote an RLC STATUS PDU, and the two names, STATUS PDU and RLC STATUS PDU, are all used in the description of the present invention.

Hereinafter, the first embodiment of the present invention is described.

When performing a logical channel prioritization (LCP) procedure, a MAC layer primarily considers, for each logical channel, the size of a STATUS PDU constructed by an RLC. That is, upon performing the LCP procedure, the MAC layer first considers the size of RLC STATUS PDU of each logical channel in a decreasing priority order of each logical channel so as to allocate radio resources, and thereafter performs the related art LCP procedure.

The first embodiment of such procedure is described with reference to FIG. 5.

FIG. 5 is a flowchart illustrating a logical channel prioritization (LCP) of a MAC layer in accordance with a first embodiment of the present invention. The LCP procedure of FIG. 5 is performed for every TTI.

Referring to FIG. 5, a MAC layer (or MAC entity) receives information related to the size of a RLC STATUS PDU (RLC STATUS PDU size information) from each RLC entity (S1). The MAC layer considers the RLC STATUS PDU size information received from each RLC entity so as to allocate radio resources to each logical channel in the decreasing order of each logical channel priority (S2).

If any radio resources remains (S3) after the allocation of radio resource to each logical channel at the step S2, then the remaining radio resource is allocated to each logical channel in the decreasing priority order up to their configured PBR (S4). After the step S4, if any radio resource remains, the remaining radio resource is allocated to data in the decreasing priority order (S6).

FIG. 6 is a flowchart illustrating a logical channel prioritization (LCP) procedure of a MAC layer in accordance with a second embodiment of the present invention, which is another exemplary embodiment of the LCP procedure of the MAC layer. The LCP procedure of FIG. 6 is performed for every TTI. Comparing the second embodiment of FIG. 6 with the first embodiment of FIG. 5, in the embodiment of FIG. 6, upon allocating logical channels, the LCP procedure is performed based upon each STATUS PDU size and each PBR. That is, all the logical channels are allocated based upon each PBR and each RLC STATUS PDU in the decreasing order of the logical channel priority.

Hereinafter, the LCP procedure according to the second embodiment of the present invention will be described in more detail with reference to FIG. 6.

The MAC layer (MAC entity) receives information related to the size of RLC STATUS PDU (RLC STATUS PDU size information) from each RLC entity (S11). The MAC layer then allocates radio resources to each logical channel in a decreasing priority order based upon the RLC STATUS PDU size information received from each RLC entity and each PBR (S12).

After the step S12, if any radio resource remains (S13), the MAC layer may further allocate the remaining resource to data in the decreasing priority order (S14).

In the meantime, in case of the first and second embodiments of the present invention, for each TTI, in order to consider the size of the RLC STATUS PDU of each logical channel during the LCP procedure, the RLC entity should inform the MAC layer of the size of the STATUS PDU scheduled for transmission.

As aforesaid, the first and second embodiments of the present invention illustrate that radio resources can be allocated to each logical channel based upon the RLC STATUS PDU size information, through the interaction between the RLC entity and the MAC layer. Therefore, in the present invention, the radio resources can be allocated to the STATUS PDU prior to data PDUs, such that the STATUS PDU can be sent prior to the data PDUs.

Hereinafter, a third embodiment of the present invention will be described.

FIG. 7 is a flowchart illustrating a method for allocating radio resources based upon a size of STATUS PDU, performed by an RLC layer, in accordance with a third embodiment of the present invention.

For supporting the operation of the MAC, as illustrated in the first and second embodiments of the present invention, it should be checked for each TTI whether a STATUS PDU scheduled for transmission exists, and if so, the size of the corresponding STATUS PDU should be informed to the MAC. Such RLC-MAC interaction is required to allow the operation method of the MAC.

However, unlike the above method, the RLC itself can be operated to avoid an RLC deadlock state. That is, when receiving information (indication) related to an available resource from the MAC layer, if the available resource is larger than or equal to the size of a STATUS PDU, the RLC entity may prioritize the STATUS PDU over RLC data PDUs for transmission. That is, the available resource is first allocated to the RLC STATUS PDU, and if any resource remains, such remaining resource is allocated to the RLC data PDUs.

Also, if the available resource indicated from the MAC is smaller than the STATUS PDU, the RLC entity may not send the STATUS PDU (i.e., skip the transmission of the STATUS PDU) for this transmitting opportunity. In other words, the RLC entity may send the STATUS PDU in the earliest transmitting opportunity, namely, when the available resource is larger than or equal to the size of the STATUS PDU.

Still referring to FIG. 7, the RLC entity receives an indication of an available resource from the MAC layer (S21). If the size of the received available resource is larger than or equal to the size of the STATUS PDU (S22), the RLC entity primarily allocates the resource to the RLC STATUS PDU (S23). After allocating the resource to the STATUS PDU, if any resource remains, the RLC entity then allocates the remaining resource to the RLC data PDU (S24). However, if the size of the radio resource is smaller than the size of the STATUS PDU (S22), the RLC entity skips the transmission of the RLC STATUS PDU for this transmitting opportunity. Afterwards, the RLC entity checks the size of radio resource for every TTI, so as to send the STATUS PDU when the size of the resource is larger than the STATUS PDU (S25).

Hereinafter, an RLC entity according to the present invention will be described.

An RLC entity according to the present invention may be a device including a module configured to receive an indication of radio resource from a MAC layer, check whether a STATUS PDU is scheduled to be sent to a peer RLC entity; compare the size of the received radio resource with the size of the STATUS PDU scheduled for transmission, primarily allocate the radio resource to the STATUS PDU so as to send the STATUS PDU to the peer RLC entity if the radio resource is larger than or equal to the STATUS PDU according to the comparison result, and skip the transmission of the STATUS PDU if the radio resource is smaller than the STATUS PDU according to the comparison result. In the meantime, the module may include a plurality of components according to its function. That is, the module may include a receiving unit for receiving radio resource, a comparing unit for comparing the size of the radio resource with the size of the STATUS PDU scheduled for transmission, and a transmitting unit for transmitting the STATUS PDU. Therefore, the module may be implemented in various types of components each capable of performing its function.

The RLC entity according to the present invention basically includes, in addition to the aforesaid component, software and hardware required for implementing the scope of the present invention, for example, an output device (e.g., display, speaker and the like), an input device (e.g., keypad, microphone and the like), a memory, a transceiver (e.g., RF module, antenna and the like). Such components can be obviously understood by those skilled in the art, and thus a detailed description thereof will not be repeated.

Meanwhile, the method according to the present invention, as described so far, can be implemented by hardware or software, or any combination thereof. For example, the method according to the present invention may be stored in a storage medium (e.g., an internal memory of a mobile terminal, a flash memory, a hard disc, etc.). Alternatively, the method according to the present invention can be implemented as codes or command words within a software program capable of being executed by a processor (e.g., a microprocessor in a mobile terminal).

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

Figure 1:
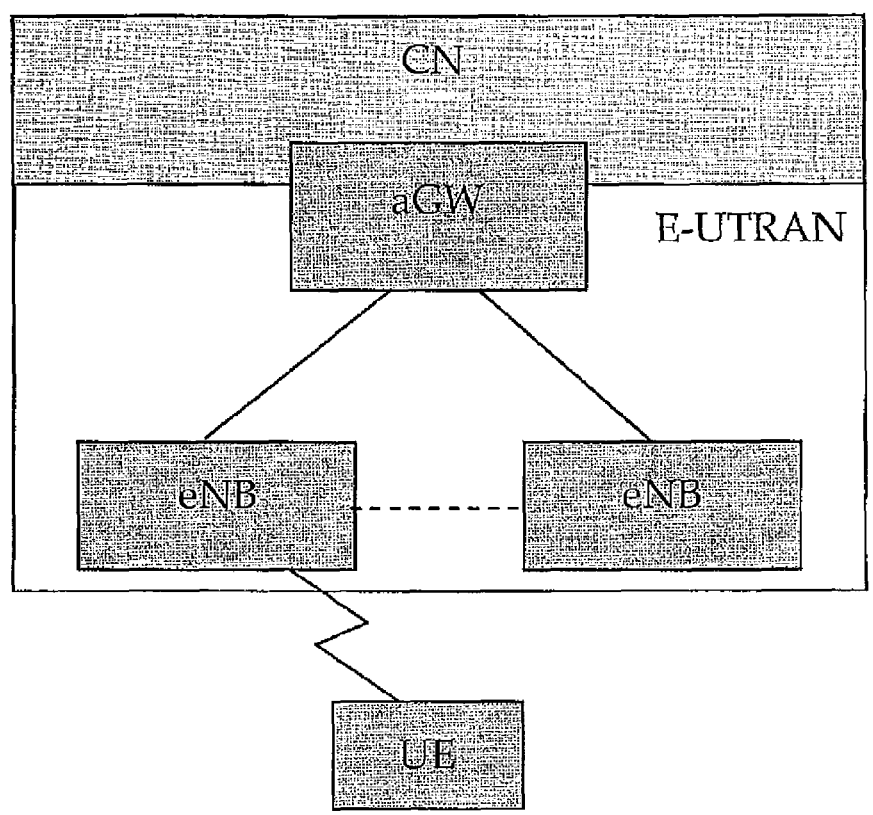
FIG. 1 is a network architecture of a long term a long term evolution (LTE) system which is the related art mobile communication system.
Figure 2:
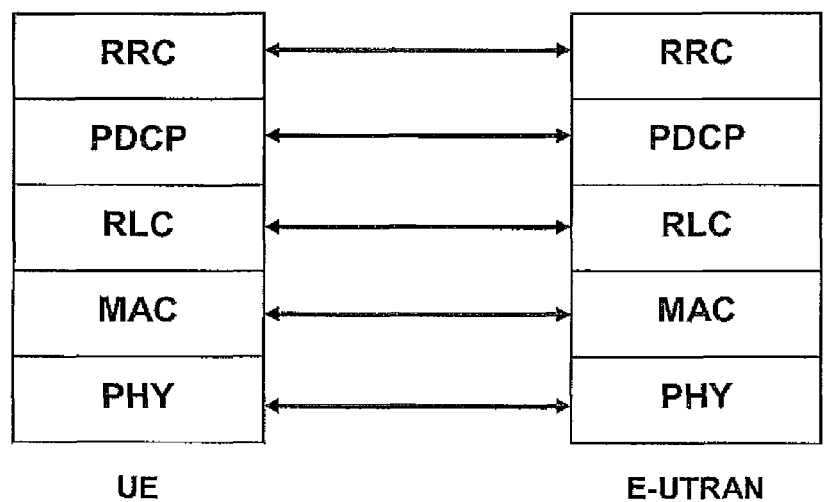
FIG. 2 is an architecture of a radio interface protocol control plane between a terminal and an E-UTRAN based upon the 3GPP radio access network standard.
Figure 3:
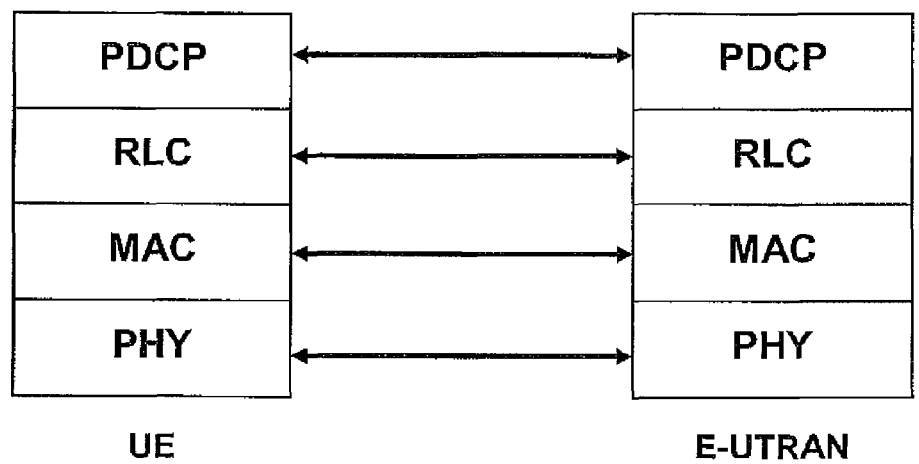
FIG. 3 is an architecture of a radio interface protocol user plane between a terminal and an E-UTRAN based upon the 3GPP radio access network standard.
Figure 4:
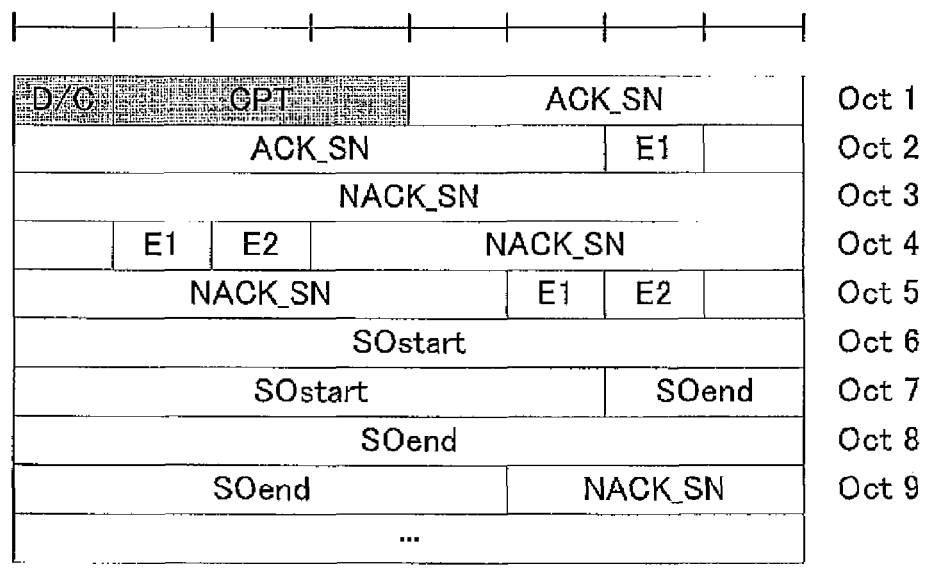
FIG. 4 is a format of STATUS PDU currently used in the LTE system; to FIG. 5 is a flowchart illustrating a logical channel prioritization procedure of a MAC layer in accordance with a first embodiment of the present invention.
Figure 5:
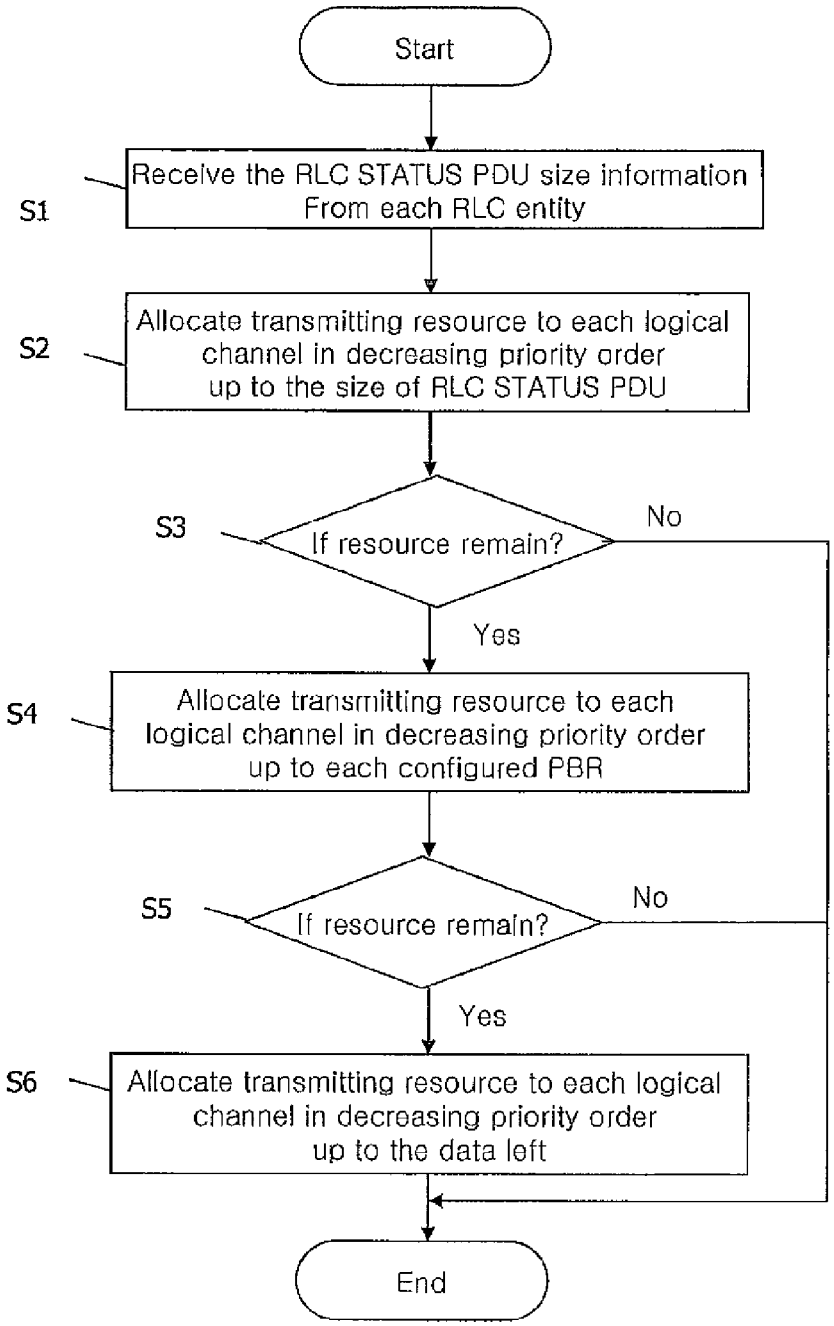
Figure 6:
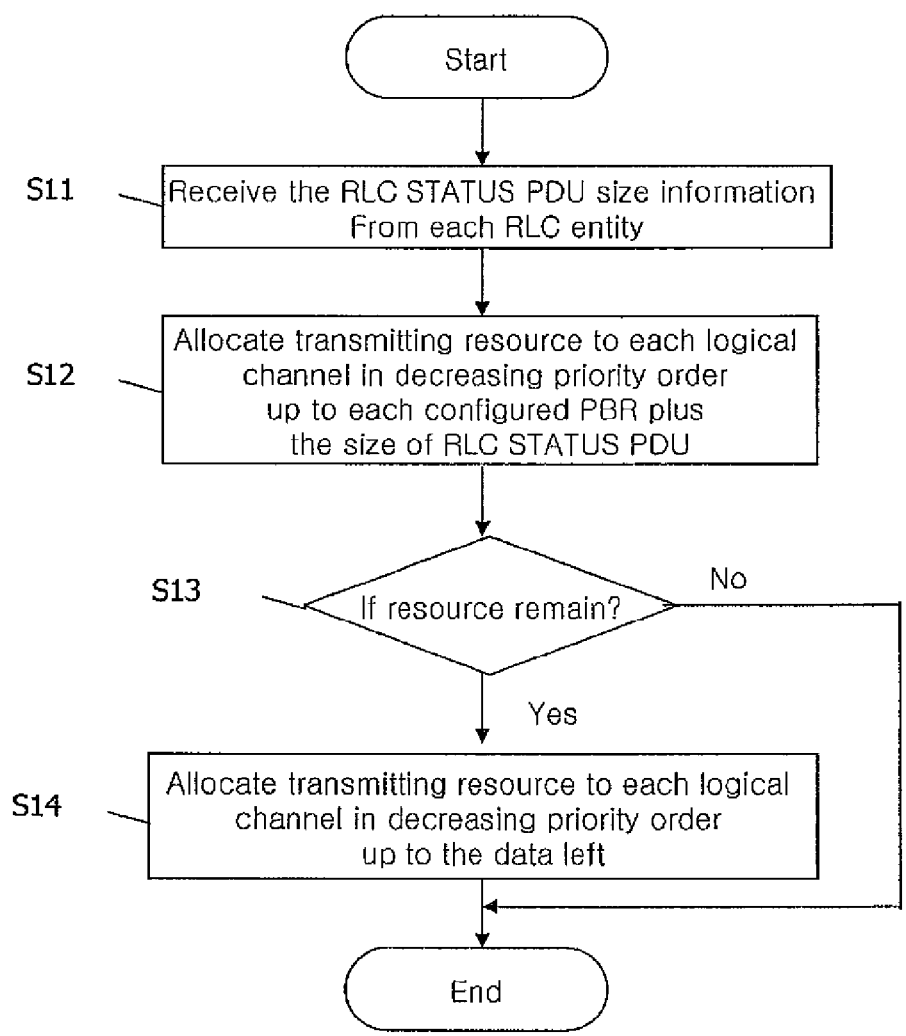
FIG. 6 is a flowchart illustrating a logical channel prioritization procedure of a MAC layer in accordance with a second embodiment of the present invention.
Figure 7:
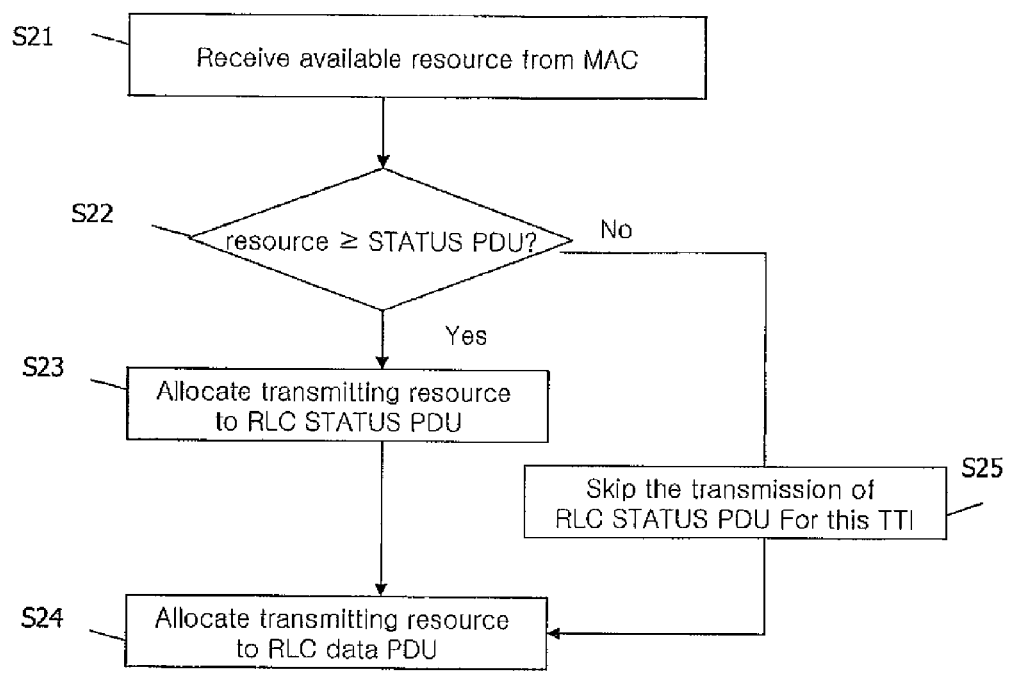
FIG. 7 is a flowchart illustrating a method for allocating radio resources by considering a size of a STAUS PDU, performed by an RLC layer, in accordance with a third embodiment of the present invention.

The invention claimed is:

1. A method for transmitting radio link control (RLC) STATUS protocol data units (PDUs) in a mobile communications system, the method comprising:
    receiving, by an RLC entity, an indication of a total size of an RLC PDU from a medium access control (MAC) entity;
    prioritizing, by the RLC entity, a transmission of the RLC STATUS PDUs over RLC data PDUs;
    constructing the prioritized RLC STATUS PDUs including a data/control (D/C) field, a CTP field, an ACK_SN field, and at least one NACK_SN field in order, the ACK_SN field including current information that is not received; and
    transmitting, by the RLC entity, the constructed RLC STATUS PDUs associated with the indicated total size of the RLC PDU corresponding to a size of the RLC STATUS PDUs to a peer RLC entity,
    wherein the constructed and transmitted RLC STATUS PDUs include only negative acknowledgement information of RLC PDUs, and
    wherein the ACK_SN field is for the peer RLC entity to indicate previous information that is received.

2. The method of claim 1, further comprising:
    performing a first step of allocating an available resource to the RLC STATUS PDUs by the RLC entity; and
    if any of the available resource remains after the first step of allocating, then performing a second step of allocating the remaining resource to the RLC data PDUs by the RLC entity.

3. The method of claim 1, further comprising:
    if an indicated available resource from the MAC entity is smaller than a size of one RLC STATUS PDU, skipping by the RLC entity a transmission of the one RLC STATUS PDU for a transmitting opportunity.

4. The method of claim 3, wherein the available resource and the one RLC STATUS PDU are checked for every transmission time interval (TTI).

5. The method of claim 1, further comprising:
    checking by the RLC entity for every transmission time interval (TTI) whether one of the RLC STATUS PDUs is scheduled for transmission; and if one of the RLC STATUS PDUs is scheduled for transmission, then informing a size of the corresponding RLC STATUS PDU to the MAC entity.

6. A device configured to transmit radio link control (RLC) STATUS protocol data units (PDUs), the device comprising:
a medium access control (MAC) entity; and
an RLC entity configured to:
receive an indication of a total size of an RLC PDU from the MAC entity,
prioritize a transmission of the RLC STATUS PDUs over RLC data PDUs,
constructing the prioritized RLC STATUS PDUs including a data/control (D/C) field, a CTP field, an ACK_SN field, and at least one NACK_SN field in order, the ACK_SN field including current information that is not received, and
transmit the constructed RLC STATUS PDUs associated with the indicated total size of the RLC PDU corresponding to a size of the RLC STATUS PDUs to a peer RLC entity,
wherein the constructed and transmitted RLC STATUS PDUs include only negative acknowledgement information of RLC PDUs, and
wherein the ACK SN field is for the peer RLC entity to indicate previous information that is received.

7. The device of claim 6, wherein the RLC entity is configured to:
perform a first step of allocating an available resource to the RLC STATUS PDUs, and
if any of the available resource remains after the first step of allocating, then perform a second step of allocating the remaining resource to the RLC data PDUs.

8. The device of claim 6,
wherein the RLC entity is configured to skip a transmission of the one RLC STATUS PDU for a transmitting opportunity if an indicated available resource from the MAC entity is smaller than a size of one RLC STATUS PDU.

9. The device of claim 8, wherein the available resource and the one RLC STATUS PDU are checked for every transmission time interval (TTI).

10. The device of claim 6,
wherein the RLC entity is configured to:
check for every transmission time interval (TTI) whether one of the RLC STATUS PDUs is scheduled for transmission, and
if one of the RLC STATUS PDUs is scheduled for transmission, then inform a size of the corresponding RLC STATUS PDU to the MAC entity.

* * * * *